United States Patent Office 3,147,308
Patented Sept. 1, 1964

3,147,308
PROCESS FOR PREPARING TETRAMETHYL-
THIURAM DISULFIDE
Johnnie M. Aulbaugh, Baytown, and William R. Trutna,
Pasadena, Tex., assignors to E. I. du Pont de Nemours
and Company, Wilmington, Del., a corporation of
Delaware
No Drawing. Filed May 11, 1962, Ser. No. 194,183
1 Claim. (Cl. 260—567)

This invention relates to the preparation of tetramethylthiuram disulfide by the chlorine oxidation of dimethyldithiocarbamate in aqueous medium.

Tetramethylthiuram disulfide has heretofore been prepared by various methods. Known methods are shown for example in Cooper U.S. Patent No. 2,375,083, Cheshire and Trutna U.S. Patent No. 2,751,415, and Nadler and Meece U.S. Patent No. 2,751,416.

On scale-up to commercial levels of production, none of the prior art methods are completely satisfactory. They have one or more disadvantages such as slowness, poor yield and poor product quality.

According to the present invention a narrow range of critical conditions has been found which can be utilized on a large scale to give almost 100% yields of extremely high purity tetramethylthiuram disulfide.

The process generally involves the chlorine oxidation of an aqueous dimethyldithiocarbamic acid salt solution under the following essential conditions:

(1) Low velocity of gaseous chlorine mixture relative to liquid reactant, in the range from 10 to 100, and preferably 20 to 50 feet per second.

(2) Energy input of from 500 to 5,000 foot pounds per minute per gallon of liquid in each reaction step.

(3) Unusually high chlorine dilution with air of at least 25 and preferably at least 50 volumes of air per volume of chlorine. Above about 200 is not economic.

(4) Holdup time of dithiocarbamate solution in the reaction of 1 to 10 and preferably 2 to 5 minutes.

(5) Utilize at least two reaction zones with a portion of the air-chlorine mixture introduced into each zone.

(6) Any given sample of air-chlorine mixture must not remain in contact with the carbamate solution for longer than 0.5 second before either the chlorine is depleted or the air-chlorine mixture sample is removed from contact. Failure to observe this condition causes significant reduction in product yield and purity.

(7) Air-chlorine bubbles through the carbamate solution should exceed 0.01 inch in diameter but not be greater than 0.5 inch. This is particularly important since in prior are processes it was believed desirable to increase contact area between the gas and liquid phases in this reaction, and it was believed that the smaller the bubbles the better. However, it has been found unexpectedly that below 0.01 inch undesirable side reactions are caused which greatly reduce product yield and purity.

The above reaction can be run in any convenient apparatus. One such type consists of a long horizontal pipe dammed at both ends to allow filling the pipe about half full of liquid. Agitation is provided for the gas phase and for the liquid phase below it. Aqueous sodium dimethyl dithiocarbamate solution is added at one end and thiuram slurry removed from the other. Diluent air is added to the top of the pipe either countercurrent or cocurrent to the direction of flow of the liquid stream. Chlorine is added in more or less equal amounts at two or more approximately equally spaced points along the reactor length. An aqueous slurry of tetramethylthiuram disulfide is removed from the end of the reactor pipe.

Another attractive alternative reaction system for carrying out the purposes of this invention involves the adaptation of a conventional sieve plate column. Since sieve plate columns are widely used in the chemical industry and are readily available, their use makes a convenient way of carrying out the oxidation of sodium dimethyldithiocarbamate under the preferred reaction conditions. A deep seal (6 to 10" of liquid depth instead of the normal 1 to 2") sieve plate column is preferred in order to get good liquid mixing and chlorine absorption. Aqueous sodium dimethyldithiocarbamate solution is fed to the top of the column and a slurry of thiuram removed from the bottom. Air is fed to the bottom of the column at rates established by industry practice such that the area immediately below the next plate above is essentially free of liquid. Chlorine is added to the diluent gas prior to its contacting each plate. Means for mixing must be provided to insure a uniform chlorine gas mixture. The diameter of the column, gas flow, number and size of holes in the plate must be such that the gas velocity is in accordance with the reaction conditions defined above.

The aqueous dithiocarbamate solution preferably is a solution of sodium dimethyldithiocarbamate. However, other water-soluble salts such as the ammonium and potassium salts of dimethyldithiocarbamate can be used. Preferably, the aqueous solution has a pH within the range of about 9–11 when introduced into the system. A concentration of the dithiocarbamate in this solution can vary widely up to the saturation point, that is, up to about 40–50%. At the higher concentrations, the slurries formed in the equipment as tetramethylthiuram disulfide precipitates are inconveniently thick and tend to interfere with the proper flow of the material. Therefore, it is preferred to operate at a dithiocarbamate feed concentration in the order of 5–20% by weight although there is no serious objection to the use of lower concentrations if equipment and production requirements permit. There is, however, an advantage in using concentrations, in the higher portion of the latter range, say in the order of 15–20% by weight, or higher if flowability is not a problem in the particular equipment used. Such higher concentrations make possible the use of lower air to chlorine ratios than would otherwise be necessary with less concentrated solutions to obtain a product of equal quality and quantity.

The aqueous portion of the reacting mass preferably is maintained within the range of about pH 5–11 throughout the process. The pH of the solution drops as the reaction proceeds. The process can be operated either with or without the addition of an alkali such as sodium hydroxide, carbonate or bicarbonate. The use of an alkali may sometimes be desired to avoid too low pH during the reaction with subsequent yield loss and to avoid a sudden drop in pH upon completion of the reaction, which would result in liquors corrosive to subsequent processing equipment. For example, 5% sodium carbonate solution in water can be metered into the liquid component in the process at an intermediate point in the process, e.g., when 50–90% of the dithiocarbamate has been oxidized, in amount sufficient to maintain the exit pH at 5–7.

In order that the invention may be better understood, the following detailed examples are given in addition to the examples already given above:

*Example 1*

One quart of a 12% by weight water solution of sodium dimethyldithiocarbamate is charged into a glass reaction vessel at 25° C. and a pH of 10.8. A mixture of air and chlorine in the ratio of 90 volumes of air to one volume of chlorine is added through a glass tube at a velocity of 25 feet/second to the bottom of the flask. Turbulence in the liquid is obtained by mechanical agitation to which 1000 foot lbs./minute is supplied. The chlorine-air mixture after leaving the glass tube remains in contact with the sodium dimethyldithiocarbamate less than 0.5 second and the bubbles of gas formed average approximately ¼ inch in diameter.

The superficial velocity of the gas as it leaves the liquid surface is about 2 feet/second. The addition of the chlorine-air mixture to the reaction flask is continued until substantially all of the sodium dimethyldithiocarbamate is reacted, which occurs in about 10 minutes. The liquid in the reaction flask consists of a suspension of tetramethylthiuram disulfide at a temperature of 30° C. and a pH of 2.6.

The precipitated tetramethylthiuram disulfide is filtered, washed and dried. The dried product contains 99.6% tetramethylthiuram disulfide. A process yield of 99.0% based on the sodium dimethyldithiocarbamate charged was obtained.

*Example 2*

Using a three-stage vertical reactor there is fed into the bottom reactor stage a chlorine-air mixture containing about 25 volumes of air per volume of chlorine. The gaseous mixture is fed at a rate such as to produce a superficial velocity of about 20 feet/second in the lines leading to the three gas-liquid separators.

A 10% solution of sodium dimethyldithiocarbamate in water, pH 10.5 and temperature of about 20° C. is introduced to the top reactor stage at a rate of about one gallon of said solution for each 12 cubic feet of air. The liquid lines exiting the gas-liquid separators for each of the reactor stages are opened to insure maximum recirculation of liquid.

The gas entering each reactor stage supplies an energy input of 3700 foot lbs./minute/gallon of liquid in each stage and bubble formation averages below about ¼ inch in diameter. The gas velocity relative to the liquid in the pipeline entering the gas liquid separator is about 5 feet/second. The time of exposure of the air-chlorine mixture to the sodium dimethyldithiocarbamate solution in each stage before passing to the next stage is less than 0.5 second.

About 99% of the chlorine introduced into the bottom reactor stage is consumed in contacting the liquid component in the bottom reactor stage. An additional quantity of chlorine is introduced into the air entering the next reactor stage to restore the chlorine air ratio to 25 to 1 and likewise additional chlorine is added to the air entering the third reactor stage to maintain a 25 to 1 chlorine-air ratio. The liquid component overflows from the bottom reactor stage at temperature of about 35° C. and a pH of 3. The total reaction time is about 2 minutes. The bottom reactor effluent contains a suspension of tetramethylthiuram disulfide precipitate. This precipitate is removed by filtration, washed and dried. The dried product contained 99.5% tetramethylthiuram disulfide. The process provides a yield of 97% based on the sodium dimethyldithiocarbamate and 85% based on the chlorine.

*Example 3*

A series of five vessels are arranged so that liquid fed to the first vessel overflows by means of a pipe to the second vessel and subsequently to each vessel until it exits the fifth vessel. An 11% water solution, by weight, of sodium dimethyldithiocarbamate pH 11, temperature of 25° C., is metered into the first vessel at a rate of 10 gallons/minute. A flat plate, perforated with ⅛ inch holes, is inserted to form a false bottom in each of the vessels about a foot below the liquid overflow pipe. A pipeline is provided, for the introduction of a mixture of air and chlorine at a rate of about 165 c.f.m. and at a ratio of about 50 volumes of air to one volume of chlorine, to the first vessel in a manner such that the gas mixture is forced up through the perforations in the plate. Pipelines are provided to conduct the gas from the top of the first vessel, which top is about 2 feet above the liquid level or a sufficient distance to secure gas-liquid separation, to below the perforated plate on the second vessel and likewise piping is provided to conduct the gas from the top of the vessels to below the perforated plate on the next vessel until the gas exits the fifth vessel. The number of perforations in the plate and the size of the vessel are such that a gas velocity of 50 feet/second is obtained in the holes of the plate and a superficial velocity of 2 feet/second is obtained in the vessels. Additional quantities of chlorine are added to the gas exiting each vessel containing substantially no chlorine such that the volume ratio of air to chlorine is maintained at about 50 to 1.

The gas passing through each reactor stage provides an energy input of 1,400 foot lbs./minute/gallon of liquid in each stage to secure adequate liquid turbulence. The total holdup time or reaction time is about 5 minutes. A 5% solution of sodium carbonate is added to the last stage at the rate of about 0.02 mol/mol of sodium dithiocarbamate fed in order to maintain the pH of the liquid leaving the fifth vessel at about 6. The total quantity of chlorine fed to the reaction system is such that complete reaction of the sodium dimethyldithiocarbamate is obtained. The average concentration at which the sodium dimethyldithiocarbamate solution is reacted is 40% of the initial concentration.

The air-chlorine mixture contacts the sodium dimethyldithiocarbamate for less than 0.5 second in each stage before passing on to the next stage. The bubbles of air-chlorine mixture formed in each stage are slightly larger than one-eighth inch in diameter.

An aqueous suspension of tetramethylthiuram disulfide is present in the liquid leaving the fifth vessel. The suspension is at a temperature of about 40° C. The precipitate is removed by filtration, washed and dried. The dried product contains 99.7% tetramethylthiuram disulfide. A yield of 99.4% based on the sodium dimethyldithiocarbamate and of 88% based on the chlorine is obtained.

*Example 4*

In apparatus similar to that used in Example 3 except that there are eight vessels instead of five, a 12% water solution by weight of sodium dimethyldithiocarbamate, pH 10.6, temperature 20° C., is metered into the first vessel at 5 gallons/minute. Air at the rate of 103 c.f.m. together with chlorine at a rate of 1.03 c.f.m. is fed to the first of the eight vessels under the perforated plate. The velocity of the gas through the holes in the perforated plate is about 35 feet/second. The vessel is of such a size that the superficial gas velocity through the vessel is 2.5 feet/second. The distance between the perforated plate and the liquid overflow is 6 inches, which allows approximately 6 inches of liquid depth in each vessel. To the gas exiting the first vessel and entering below the perforated plate on the second vessel chlorine is added at a rate of 1.03 c.f.m. Similar amounts of chlorine are added to the gas leaving the remaining vessels with the exception of the gas leaving the eighth vessel. The gas leaving each stage is essentially free of liquid. The total holdup time is about three minutes. Agitation energy of 1600 foot lbs./minute/gallon of liquid holdup is supplied by the gas in each stage.

The air-chlorine mixture contacts the sodium dimethyldithiocarbamate solution for less than 0.2 second in each stage before passing to the next stage. The bubbles of air-chlorine mixture formed in each stage are slightly larger than one-eighth inch in diameter.

The liquid overflowing the last stage consists of an aqueous suspension of tetramethylthiuram disulfide at a pH of 2.7 and a temperature of 35° C. After filtration and washing, the dried product is 99.8% tetramethylthiuram disulfide. A process yield of 99.3% based on the sodium dimethyldithiocarbamate charged is obtained.

*Example 5*

A reactor is constructed of six horizontal 12-foot sections of pipe mounted one above the other in the same vertical plane. Return bends are installed on alternate ends of the pipe banks in such a manner as to form a continuous section of pipe. Semi circular plates (weirs) are installed on each end of each 12-foot section or a total of 12 plates to cover the bottom half of the pipe. A solid flat agitator paddle five inches in width is inserted throughout the length of the horizontal liquid phase on each of the 12-foot sections with a power consumption of 2 horsepower for each of the six sections. Similarly a horizontal agitator blade five inches in width and 11.5 feet long is installed throughout the length of the gas phase on each of the six pipe sections. This agitator is operated at a speed of 1750 revolutions per minute.

A 10% aqueous solution of sodium dimethyldithiocarbamate, at a pH of 10 and temperature 20° C. is fed at a rate equivalent to 25 lbs./minute of 100% sodium dimethyldithiocarbamate to the inlet side of the top pipe in the reactor pipe bank. Air at the rate of 500 c.f.m. is fed cocurrent to the flow of the aqueous solution.

The six agitators for the liquid phase and the six agitators for the gas phase are started. Chlorine at the rate of about 6.3 cubic feet per minute is fed to the inlet side of each of the six 12-foot pipe sections to obtain an 80 to 1 dilution of the chlorine with air.

The air-chlorine mixture remains in contact with the sodium dimethyldithiocarbamate solution for 0.5 second in each stage before passing to the next stage and the bubbles formed in each stage are somewhat less than ¼ inch in average diameter.

Tetramethylthiuram disulfide was removed from the end of the last pipe section as an aqueous slurry at the rate of 20.8 lbs./minute. The product was essentially 100% tetramethylthiuram disulfide. A yield of 99% based on the sodium dimethyldithiocarbamate fed is obtained.

*Example 6*

Two glass reaction vessels are arranged so that 960 gms./min. of a 9.5% by weight aqueous solution of sodium dimethyldithiocarbamate at a temperature of 21° C. and pH of 10.1 is fed to the first vessel. A side opening six inches above the bottom of the first vessel is provided for liquid to overflow to the second vessel. The second vessel is likewise equipped with a side opening so that the liquid overflows to maintain a constant liquid level in the second vessel. A mixture of air and chlorine in the ratio of 120 volumes of air to one volume of chlorine is introduced below the liquid level in the first vessel through a tube at a velocity of 40 feet/second. The superficial velocity of the gas leaving the liquid surface is about 1 foot/second. The air-chlorine mixture remains in contact with the sodium dimethyldithiocarbamate solution for less than 0.5 second from the time it leaves the tube through which it is introduced in each vessel until it leaves the liquid surface. The gas bubbles are about one-quarter inch in diameter.

After the gas has disengaged the liquid in the first vessel it is removed from the first vessel and an amount of chlorine equal to that added to the first reaction vessel is again added to the gas stream. The gas stream is then introduced below the liquid level in the second vessel which is identical with the first vessel.

Turbulence in the liquid in each vessel is maintained by mechanical agitation with 1500 foot pounds/minute supplied to each vessel. The total hold-up time in both vessels is about six minutes.

The liquid leaving the second vessel is a suspension of tetramethylthiuram disulfide at a temperature of 28° C. and a pH of 5.8. The precipitated tetramethylthiuram disulfide is recovered by filtration, washed and dried. A process yield of 99.2% based on the sodium dimethyldithiocarbamate is obtained and the dried product contains 99.8% tetramethylthiuram disulfide.

This application is a continuation-in-part of our co-pending application Serial No. 9,548, filed February 18, 1960 (now abandoned), which in turn is a continuation-in-part of our application Serial No. 751,284, filed July 28, 1958 (now abandoned).

The invention claimed is:

A continuous process for the preparation of tetramethylthiuram disulfide by the chlorine oxidation of a salt of dimethyldithiocarbamic acid, the combination of steps comprising
(a) bringing together an aqueous solution of said salt and less than a stoichiometric amount of chlorine in a gaseous stream;
(b) wherein said chlorine is diluted with from 25 to 200 volumes of air per volume of chlorine;
(c) maintaining the velocity of said gaseous stream in the range from 10 to 100 feet per second relative to said solution;
(d) applying an energy input to said solution of from 500 to 5,000 foot pounds per minute per gallon of liquid reactor holdup;
(e) introducing said solution into a series of at least two reaction zones;
(f) passing said solution through said series of zones in a total contact time of 1–10 minutes;
(g) refortifying with additional chlorine said gaseous stream in a zone in the absence of said solution;
(h) maintain air-chlorine mixture in contact with said solution for less than 0.5 second; and
(i) maintain air-chlorine bubbles in said solution within the range from 0.01 to 0.5 inch average diameter.

References Cited in the file of this patent

UNITED STATES PATENTS

| | | |
|---|---|---|
| 2,751,415 | Cheshire et al. | June 19, 1956 |
| 2,751,416 | Nadler et al. | June 19, 1956 |
| 2,777,878 | Counts et al. | Jan. 15, 1957 |

FOREIGN PATENTS

| | | |
|---|---|---|
| 1,023,030 | Germany | Jan. 23, 1958 |